(12) United States Patent
Österlund

(10) Patent No.: US 10,694,332 B2
(45) Date of Patent: Jun. 23, 2020

(54) ESTABLISHING THE LOCATION OF UNMANAGED NETWORK ACCESS POINTS

(71) Applicant: TELEFONAKTIEBOLAGET LM ERICSSON (PUBL), Stockholm (SE)

(72) Inventor: Håkan Österlund, Ekerö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/315,057

(22) PCT Filed: Jun. 3, 2014

(86) PCT No.: PCT/EP2014/061512
§ 371 (c)(1),
(2) Date: Nov. 30, 2016

(87) PCT Pub. No.: WO2015/185118
PCT Pub. Date: Dec. 10, 2015

(65) Prior Publication Data
US 2017/0195849 A1    Jul. 6, 2017

(51) Int. Cl.
*H04W 4/00* (2018.01)
*H04W 4/02* (2018.01)
(Continued)

(52) U.S. Cl.
CPC ......... *H04W 4/025* (2013.01); *H04L 65/1016* (2013.01); *H04L 65/1073* (2013.01);
(Continued)

(58) Field of Classification Search
CPC ..... H04W 84/12; H04W 48/16; H04W 48/20; H04W 4/023; H04W 4/80
See application file for complete search history.

(56) References Cited

U.S. PATENT DOCUMENTS 7,885,644 B2 * 2/2011 Gallagher ............... H04W 4/90
                                                                  455/414.2
2005/0059396 A1   3/2005 Chuah et al.
(Continued)

FOREIGN PATENT DOCUMENTS

WO   2006117759 A1   11/2006

OTHER PUBLICATIONS

3GPP, "3rd Generation Partnership Project; Technical Specification Group Core Network and Terminals; IP multimedia call control protocol based on Session Initiation Protocol (SIP) and Session Description Protocol (SDP); Stage 3 (Release 12)," 3GPP TS 24.229 V12.2.0, Sep. 2013.
(Continued)

*Primary Examiner* — Khalid W Shaheed
(74) *Attorney, Agent, or Firm* — Patent Portfolio Builders, PLLC

(57) ABSTRACT

The invention provides an apparatus and method of associating communication service sessions with geographical locations. Each of a multiplicity of user devices, attached to one or more access networks via respective access points, can determine the identity of an access point serving that particular user device. The user device then registers with a location service, via the access network, both the network access point identity and a geographical address at which the access point is located. The location service can then use the registered access point identity and geographical address to register the user device, or another user device, in a communication service in association with said geographical address. In this way, the geographical address of a registered user device, which is associated with a particular communication service session, can be determine.

20 Claims, 6 Drawing Sheets

(51) Int. Cl.
*H04W 4/029* (2018.01)
*H04L 29/06* (2006.01)
*H04W 8/06* (2009.01)
*H04W 60/00* (2009.01)
*H04W 84/12* (2009.01)
*H04W 88/08* (2009.01)

(52) U.S. Cl.
CPC .......... *H04W 4/023* (2013.01); *H04W 4/029* (2018.02); *H04W 8/06* (2013.01); *H04W 60/005* (2013.01); *H04W 84/12* (2013.01); *H04W 88/08* (2013.01)

(56) References Cited

U.S. PATENT DOCUMENTS

| | | | |
|---|---|---|---|
| 2005/0272449 A1* | 12/2005 | Gallagher | H04W 36/14 455/458 |
| 2007/0174443 A1* | 7/2007 | Shaheen | H04W 8/06 709/223 |
| 2007/0238448 A1 | 10/2007 | Gallagher et al. | |
| 2008/0162637 A1* | 7/2008 | Adamczyk | H04L 51/043 709/204 |
| 2011/0067075 A1* | 3/2011 | Barry | H04L 12/282 725/109 |
| 2014/0045505 A1* | 2/2014 | Henry | H04W 36/0061 455/444 |
| 2015/0188949 A1* | 7/2015 | Mahaffey | H04L 63/20 726/1 |

OTHER PUBLICATIONS

ETSI, "Telecommunications and Internet converged Services and Protocols for Advanced Networking (TISPAN); NGN Functional Architecture; Network Attachment Sub-System (NASS)," ETSI ES 282 004 V3.4.1, Mar. 2010.

International Search Report and Written Opinion dated Feb. 4, 2015 in related International Application No. PCT/EP2014/061512.

Office Action issued in application No. 14731172.4, dated Jan. 25, 2018; 4 pages.

Office Action issued in corresponding EP Application No. 14731172.4; dated Nov. 25, 2019; 05 pages. All references cited therein have been previously made of record.

Office Action issued in corresponding EP Application No. 14731172.4; dated Jul. 17, 2019; 05 pages. All references cited therein have been previously made of record.

* cited by examiner

ESTABLISHING THE LOCATION OF UNMANAGED NETWORK ACCESS POINTS

TECHNICAL FIELD

The present invention relates to establishing the location of unmanaged network Access Points. It is applicable in particular, though not necessarily, to the field of residential WLAN/WiFi conversational services that require physical location identification.

BACKGROUND

Customer demand for residential WLAN/WiFi conversational services that require physical location identification is growing. A classic example of this type of service is a voice service that includes the possibility of performing emergency calls where the location of the device performing the call can be identified. This is normally required by regulations in markets where the voice service is connected to the General Switched Telephone Network (GSTN).

At the moment, the WLAN Access Points (APs) in most residential homes are typically owned and managed by the person(s) living there and are called "unmanaged" APs. A communication network is needed to provide conversational services that use these APs. As the APs are unmanaged, the communication network does not know about the physical location of these APs. There are, however, alternative ways for retrieving this information from external sources. A case in point might involve a user using WLAN access point to connect, via an access point and the Internet, to an IMS-based communication network. In order to provide voice call services that meet with regulatory requirements, the IMS network would like to know the actual physical address of the user's device so that that address can be associated with call sessions involving the user.

Broadband (BB) access providers have the physical location of their clients. If the communication network and the BB access provider connecting the AP are related, i.e.: are under the control of the same operator, the communication network can obtain the physical location of the APs. Alternatively, if WLAN-capable communication devices are equipped with Global Positioning System (GPS), these devices can provide their physical locations to the communication network. However, the geographical accuracy of standard GPS systems is around 8 meters. Therefore, in a densely populated urban environment, the GPS can identify an incorrect neighboring physical location. This mistake could also happen if the communication device provides its location using internet services such as Google™ maps. Moreover, these services rely on the availability of internet, cannot be controlled by the device's user, and use standard GPS data to provide locations. Finally, the communication device could provide its location using a Third Generation Partnership Project (3GPP) cell ID. However, this method cannot be relied upon since 3GPP radio coverage can be unreliable.

As described above, there are many drawbacks and complexities with current mechanisms for obtaining a user device's physical location.

SUMMARY

The present invention provides a simple one-time procedure to associate the network identity of a WLAN AP with an AP's physical location, such as an address of residence. This relationship may be stored in a database that operates in the communication network and can be used by any location-based service provider that uses the same communication network.

According to a first aspect of the invention there is provided a method of associating communication service sessions with geographical locations. For each of a multiplicity of user devices attached to one or more access networks via respective access points, a user device determines the identity of an access point that serves that user device. The user device then registers with a location service, via the access network, both the network access point identity and a geographical address at which the access point is located. The location service can then use the registered network point access and geographical address to register the user device, or another user device, in the communication service in association with said geographical address. In this way, the geographical address of the registered user device that is associated with a particular communication service session can be determined.

The user device attached to the access network is optionally configured to transmit a registration signal of the AP, such as its Basic Set Service Identity (BSSID), to the access network.

Furthermore, the location service is optionally implemented by a communication service provider.

As a further option, the registration with a location service of the access point identity and the geographical address at which the access point is located comprises sending the detected access point identity from the user device to the location service.

At this point, one of the following may happen:
a) the location service queries about the geographical address of the detected access point. The user device then responds to the query by sending the geographical address at which the access point is located to the location service;
b) the location service identifies a previously registered geographical address for the detected access point identity and communicates this to the user device, which sends a confirmation that this is the correct geographical address to the location service.

The step of registering the network access point identity and a geographical address at which the access point is located may require sending a correct authentication code from the user device to the location service.

The step of sending the access point identity from the user device to the location service may be carried out by including the access point identity in a session setup request, or it may be carried out during registration of the user device with the communication service responsible for managing said communication service sessions.

The location service may be implemented within an IP Multimedia Subsystem, IMS, network, which facilitates the communication service sessions. Optionally, the step of registering the user device, or another user device, in the communication service in association with a geographical address, may comprise an IMS registration.

The registration process may comprise storing an association between the access point identity and the geographical address in a Home Subscriber Server (HSS) or other data store in the IMS network.

As an option, the step of registering includes sending a SIP Register message, containing at least said access point identity, from the user device to the IMS network.

According to a second aspect of the invention there is provided a user device that is configured to attach to an access point for accessing an access network. A detector is provided that is configured to detect an identity of the access point. A first registration entity is also provided which is configured to register the detected access point identity and a geographical address of the access point with a location service via the access network. A second registration entity, configured to interact with the location service, is further provided. This entity uses the access point identity to register the user device in the communication service in association with the geographical address. In this way, the geographical address of the registered user device that is associated with a particular communication service session can be determined.

The access point, to which the user device attached, is optionally a wireless access point of a Wireless Local Access Network, WLAN, and the access point identity is optionally the Basic Set Service Identity, BSSID, of the access point.

The user device is optionally provided with a wireless transceiver module for communicating with the access point.

The user device is optionally also provided with an IMS client for enabling a service session.

As a further option, the user device has a registration entity that is configured to perform the registration by sending a SIP Register message to the location service within the IMS network. The SIP Register message includes at least the access point identity.

According to a third aspect of the invention there is provided a system for implementing a location service within a communication network. The system comprises a first receiver, which is configured for receiving and registering, in a registration database, an access point identity and a geographical address associated with the access point identity for each of a multiplicity of user devices. The system further comprises a second receiver, which is provided for receiving, in connection with a user registration to a communication service, an access point identity. The second receiver is also provided for performing a lookup, using the access point identity, in the registration database in order to identify a geographical address for the communication service registration.

Optionally, the system for implementing a location service within a communication network may be configured to operate within an IMS network.

Furthermore, the first receiver in this system is optionally configured to receive at least the access point identity from a user device in a SIP Register message.

As an option, the registration database comprises a Home Subscriber Server (HSS) or other data store of the IMS network.

As a further option, the second receiver is configured to receive the access point identity for a service session in a session setup request.

DETAILED DESCRIPTION

Figure 1:
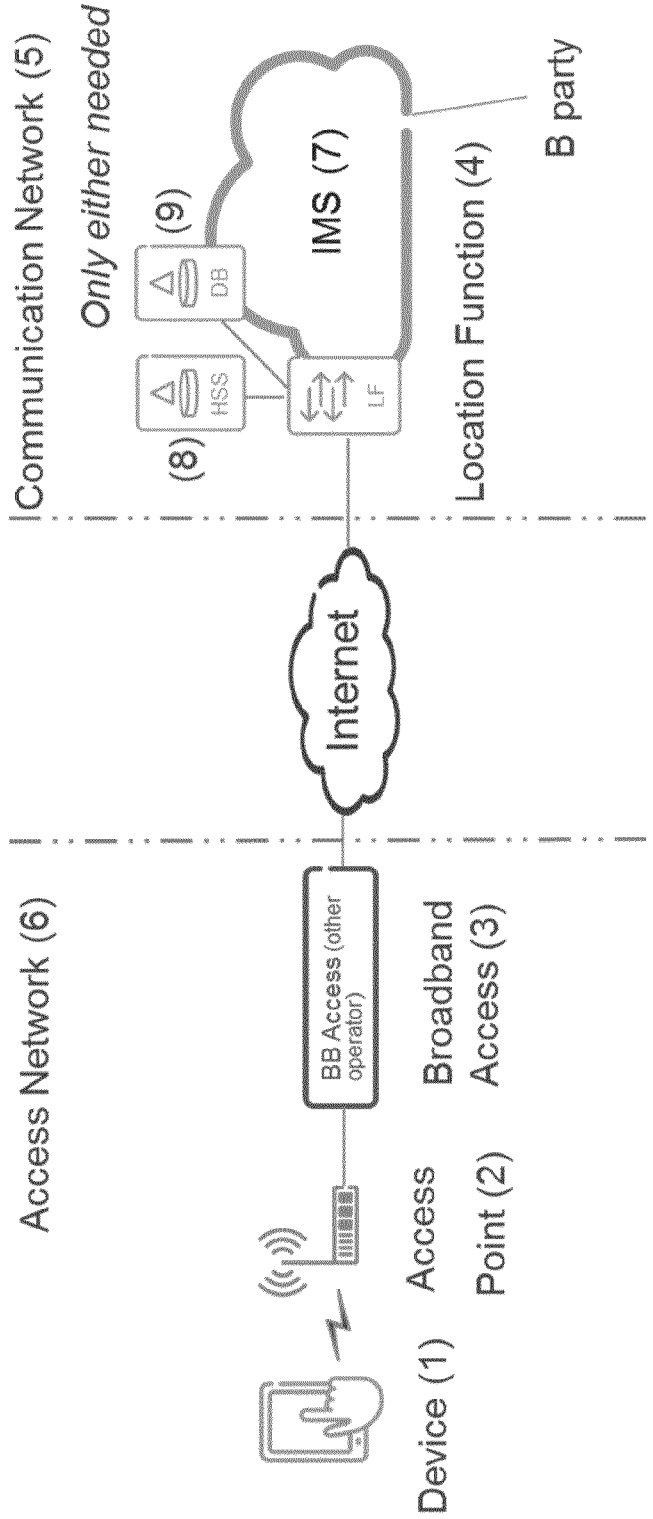
FIG. 1 illustrates schematically a general architecture that includes internet and the communication and access networks.

A network architecture, where the process to associate the network identity of a WLAN access point (AP) to the AP's physical location takes place, can be described with the help of FIG. 1. This illustrates a user device 1, located in a certain geographic location, connecting to a home WLAN AP 2 using standard procedures. The AP 2 provides a "gateway" to an access network 6. It is assumed that, once connected to the AP, the user device registers for the first time with the access network 6. The access network in turn provides connectivity to the Internet and, via the Internet, to some communication network 5 that facilitates communication sessions, in this example, voice calls, with third party user devices. FIG. 1 illustrates by way of example an IMS communication network 7, including a Home Subscriber Server 8 (HSS), the location function 4 and a database, DB, 9.

In order to facilitate certain required or desired functionality, the communication network 5 implements a location function, LF, 4 and associated database, DB, 9. This location function 4 may be implemented, in the context of an IMS network, by means of a SIP Application Server. The location function is responsible for maintaining and managing AP locations as described below.

During connection of the user device 1 to the access point, AP, 2, the user device detects an identity of the AP serving that user device. This is the first step S1 of the method shown in FIG. 2, which illustrates the procedure for associating a communication service session with a particular geographical location. The second step of this procedure, S2, is to register, from the user device, the AP identity and a geographical location for the AP with the location function 4. According to this procedure, at step S3, the location function uses the access point's network identity and geographical address to register the user device with the location function. Finally, step S4, identifies the geographical address of the communication service session using the user's device identity.

Figure 2:
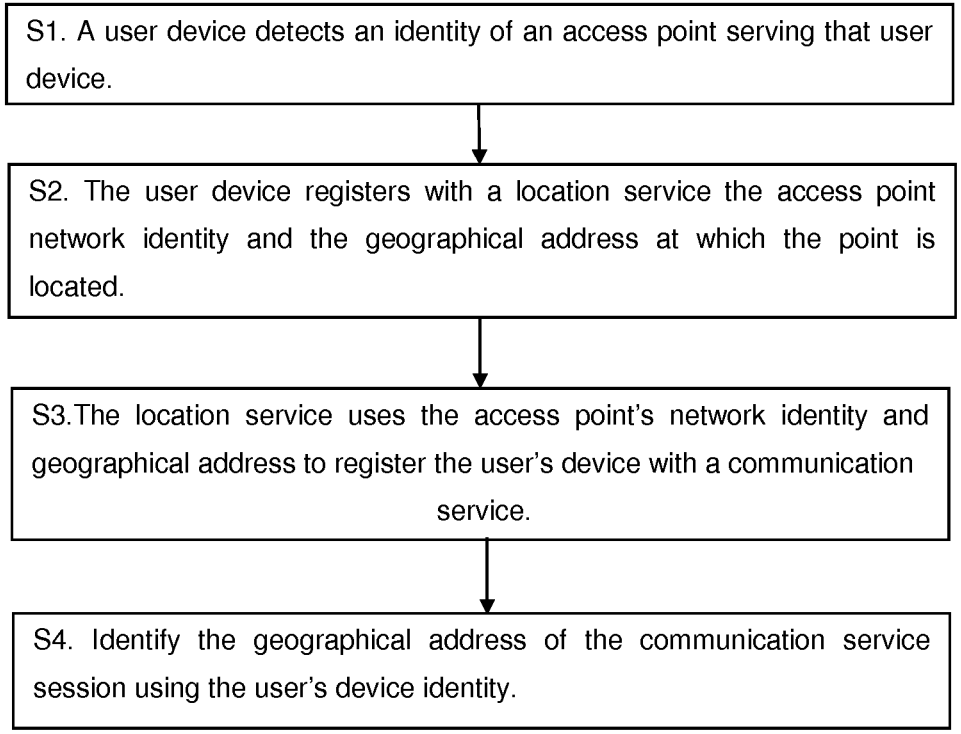
FIG. 2 is a flow diagram indicating the method steps for associating a communication service session with a geographical location.
Figure 3:
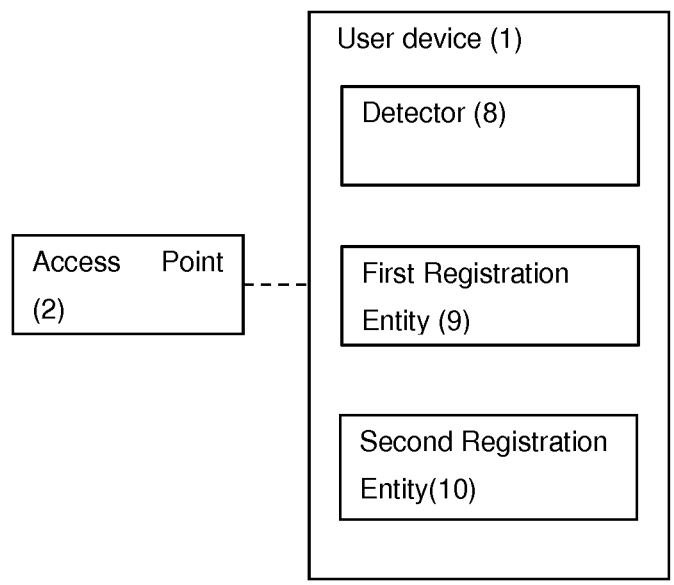
FIG. 3 illustrates schematically an access point and a user device attached to this access point.
Figure 4:
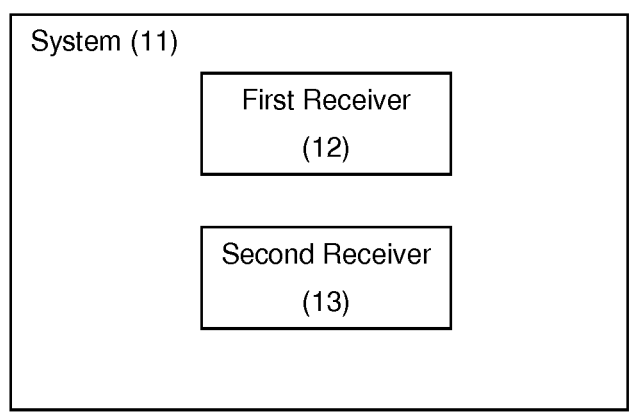
FIG. 4 illustrates first and second receivers of a system for implementing a location service within a communication network.
Figure 5:
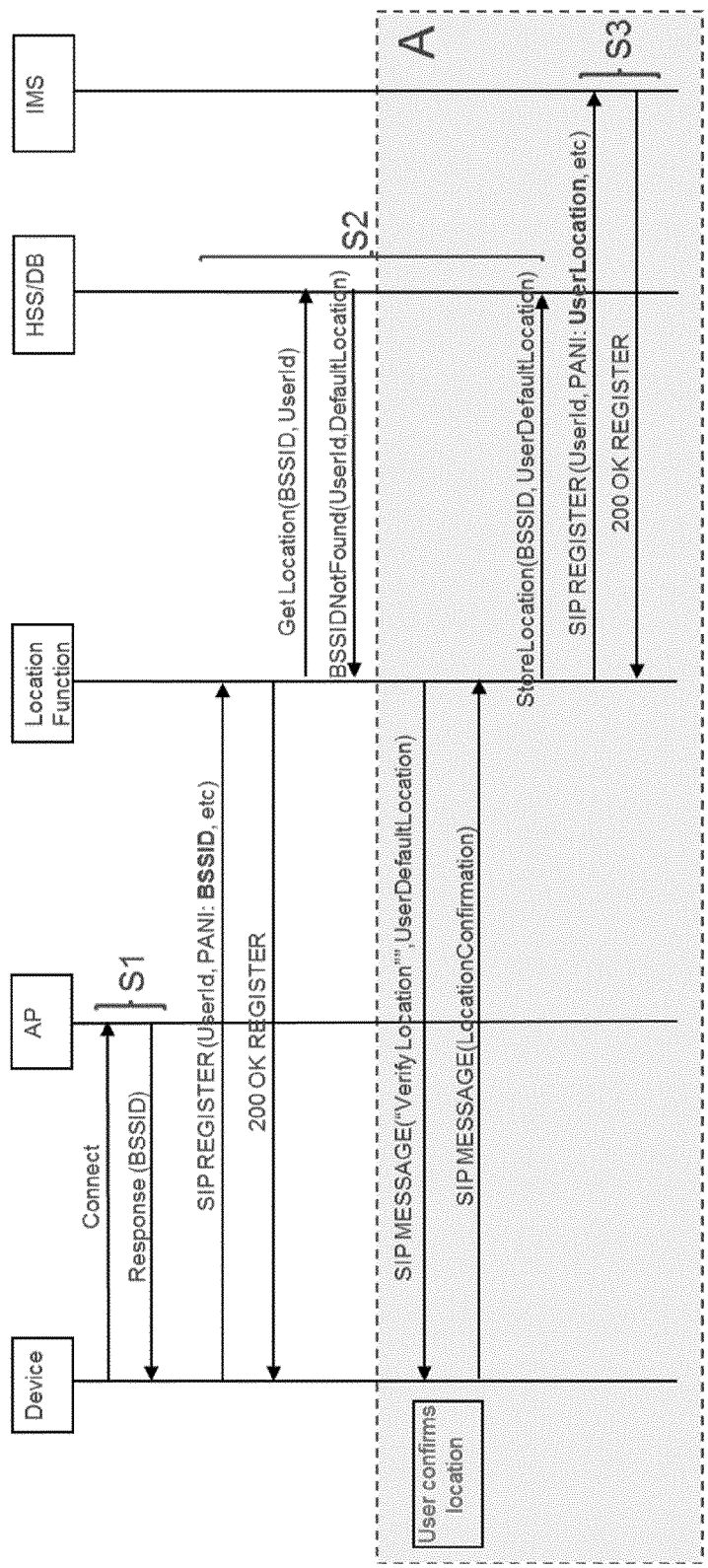
FIG. 5 describes an IMS call flow for the registration of an access point's network identity and geographical address with a location service.
Figure 6:
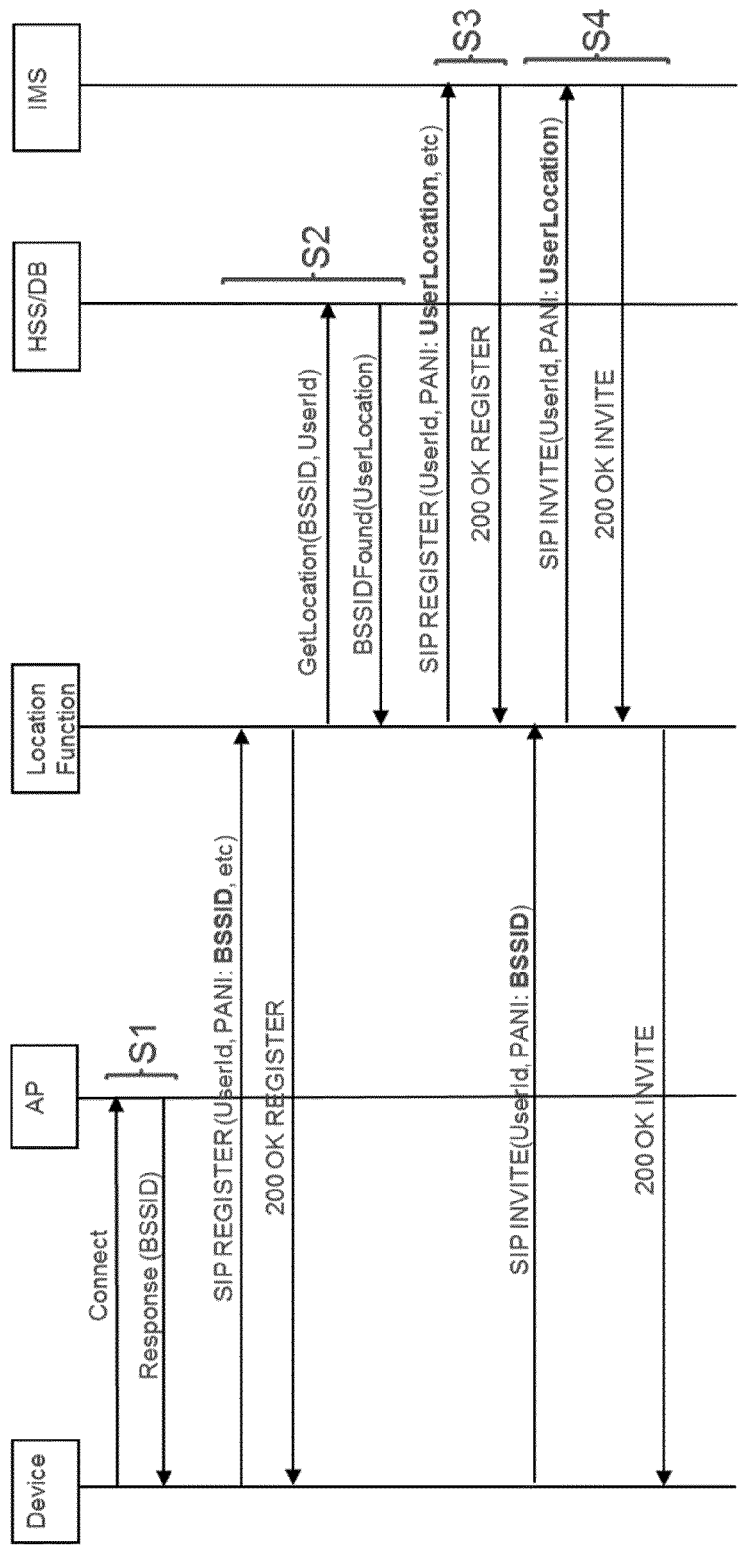
FIG. 6 is a signaling diagram illustrating an IMS call flow in which the access point's network identity, BSSID, and its geographical location are already stored in the IMS network.
Figure 7:
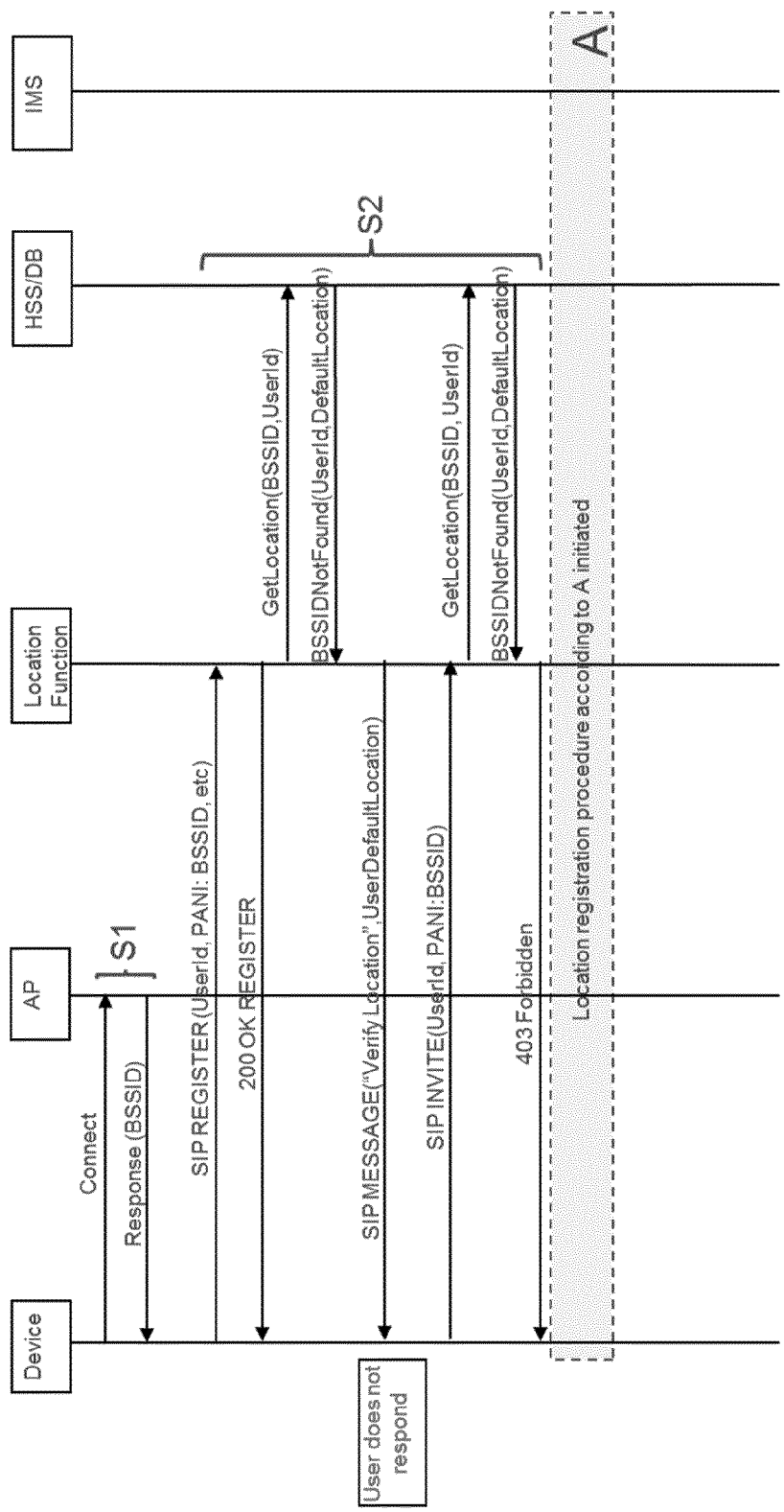
FIG. 7 is a signaling diagram illustrating an IMS call flow in which a user fails to verify his/her location when prompted and tries to make a call.

FIG. 3 illustrates an AP 2 and various components of a user device 1 wirelessly attached to it. These components include: a detector 8 that is configured to detect the identity of an access point; a first registration entity 9 that registers with the location function an AP identity and its geographical address; and a second registration identity 10, which uses the AP network identity to register the user device in the communication service network in association with a geographical address. FIG. 4 illustrates the first 12 and second 13 receivers that comprise a system for implementing the location service within the communication network. The first receiver receives and registers in a DB the AP network identity and its geographical address. The second receiver receives an access point identity in connection with a user registration to a communication service. The second receiver uses the AP identity to perform a look-up in the registration DB and identify a geographical address for the communication service registration The procedure for associating a communication service session, e.g. a IMS voice call, with a particular geographical location requires an exchange of messages between the user device, the AP and the location function in the communication network. These exchanges are illustrated in FIGS. 5, 6 and 7, which show examples of IMS call flows in three different situations. The back and forward arrows show communication between the two indicated system components. The method steps presented in FIG. 2 are described in more detail in these figures Considering the example of a WLAN AP, FIG. 5 shows the registration signaling, S1, that provides the access point identity, in this case the Basic Set Service Identity (BSSID), of the AP as seen by the user device in the 802.11 (WLAN) air interface, to the location function, assuming that the communication network is an IMS network. During initial connection to the AP, the user device receives the BSSID. The user device then uses the SIP REGISTER request with a P-Access-Network-Info (PANI) header (see 3GPP TS 24.229) as bearer of the access point identity (BSSID) to send the BSSID to the location function. The location function performs a lookup in a database that holds relationships between BSSIDs and geographical locations. Since at this point the AP is not known by the communication networks, no hit is made and the location function returns a message (using for example a SIP MESSAGE request) to the user device requesting either:

That a physical location provided in the message from the communication network (matching the registered home address of the subscriber) is confirmed to be the current location of the user, or That the current physical location is entered as input and sent back, or That a pre-provisioned authentication code is entered and sent back to verify that this registration is done from the user's home address, or That the user click on a provided HTTP link that opens a web dialogue in which the user should register/confirm his or her address.

The response is sent back to the communication network, which now stores the BSSID and matching physical location in the database. These steps are indicated by registration signaling S2. Additionally, in step S3, the location function registers an association between the user device (UserID) and the physical location.

FIG. 6 illustrates a scenario where a BSSID has already been registered with the location function in association with a physical location, e.g. a street address. When a user device attaches to the AP and sends a SIP REGISTER to the IMS, this pre-association is detected. This procedure is repeated each and every time the user device registers with the IMS network. As a result the location function can immediately register an association between the user device and the physical location in the IMS. Following this procedure, as is further illustrated by steps S4 in FIG. 6, when the user device initiates a call by sending a SIP INVITE, this is routed to the location function which includes the registered physical location (UserLocation) into the INVITE message header. The INVITE is forwarded through the IMS network towards the called party (FIG. 6 does not illustrate this further signaling, but merely illustrates the 200 OK, assuming that the call is successfully completed). IMS network nodes may make use of the location included in the INVITE for any required procedure.

Of course, any number of user devices may access the IMS network via the same access point. Following the registration of the BSSID with a physical location, each time a device performs IMS registration, including the BSSID in the SIP Register, the location function is able to identify the registered physical location and in turn register the association between the user device and that physical address.

FIG. 7 illustrates a scenario in which a user device registers a BSSID with a location function for the first time. However, the registration procedure fails, e.g. due to the user device not responding to a verification request. When the user device subsequently tries to initiate a call by sending a SIP INVITE, due to the user not having a registered location, the call fails and the system triggers the location registration procedure described in block A of FIG. 5.

It will be appreciated that the procedures described here provide a simple and efficient method for identifying the physical location of a user device making use of, e.g. voice services, via an unmanaged WLAN Access Points. There is no need for GPS support or any specific WLAN network configuration. Furthermore, the procedures do not rely on internet-based location services or specific functionalities in the WLAN-connected devices.

It will also be appreciated by the person of skill in the art that various modifications may be made to the above described embodiments without departing from the scope of the present invention.

The invention claimed is:

1. A method of associating communication service sessions with geographical locations, the method comprising, for each of a multiplicity of user devices attached to one or more access networks via respective access points:

detecting, at the user device, an identity of an access point serving the user device;

registering, by the user device, the detected identity of said access point and a geographical address at which the access point is located with a location service, via an access network of the one or more access networks, wherein the location service is implemented by a Session Initiation Protocol (SIP) application server, and wherein said step of registering the detected identity of said access point and the geographical address at which the access point is located, comprises:

receiving a query at the user device, from the location service, regarding the geographical address at which the access point is located, to register the identity of the access point, after the location service performs a lookup in a database that holds relationships between identities of access points and geographical addresses; and in response to the query received from the location service, sending the geographical address at which the access point is located, from the user device to the location service; and registering, by the location service, said user device or another user device in a communication service in association with said geographical address at which the access point is located, wherein, for a communication service session associated with the registered user device, a geographical address of the registered user device is determined.

2. The method according to claim 1, wherein said access point is a wireless access point of a Wireless Local Access Network (WLAN) and the identity of said access point is a Basic Set Service Identity (BSSID).

3. The method according to claim 1, wherein the location service is implemented by a communication network service provider.

4. The method according to claim 1, wherein said step of registering the detected identity of said access point and the geographical address at which the access point is located, further comprises sending the detected identity of said access point together with the geographical address at which the access point is located, to the location service.

5. The method according to claim 1, further comprising:
receiving a previously registered geographical address from the location service;
determining whether the received previously registered geographical address matches a home address associated with a user using the user device; and
sending, in response to determining that the received previously registered geographical address matches the home address associated with the user, a confirmation from the user device to the location service.

6. The method according to claim 1, wherein said step of registering the detected identity of said access point and the geographical address at which the access point is located, further comprises sending a correct authentication code from the user device to the location service.

7. The method according to claim 1, further comprising sending the detected identity of said access point from the user device to the location service by including the detected identity of said access point in a session setup request or during registration of the user device with the communication service responsible for managing said communication service sessions.

8. The method according to claim 1, wherein said location service is implemented within an IP Multimedia Subsystem (IMS) network, the IMS network facilitating said communication service sessions, and wherein said step of registering said user device or another user device in the communication service in association with said geographical address at which the access point is located, comprises an IMS registration.

9. The method according to claim 8, wherein said IMS registration comprises storing an association between the detected identity of said access point and the geographical address at which the access point is located, in a Home Subscriber Server (HSS) or other data store in the IMS network.

10. The method according to claim 8, wherein said IMS registration comprises sending an SIP Register message, containing at least said detected identity of said access point, from the user device to the IMS network.

11. A user device configured to attach to an access point for accessing an access network, the user device comprising:
a detector configured to detect an identity of the access point;
a first registration entity configured to register the detected access point identity and a geographical address at which the access point is located, with a location service via the access network, wherein the location service is implemented by a Session Initiation Protocol (SIP) application server, and wherein to register the detected access point identity and the geographical address at which the access point is located, the first registration entity is configured to:
receive a query, from the location service, regarding the geographical address at which the access point is located, to register the identity of the access point, after the location service performs a lookup in a database that holds relationships between identities of access points and geographical addresses; and
send, in response to the query received from the location service, the geographical address at which the access point is located, to the location service; and
a second registration entity configured to interact with the location service, using the detected access point identity, to register said user device in a communication service in association with said geographical address at which the access point is located, wherein, for a communication service session associated with the registered user device, a geographical address of the registered user device is determined.

12. The user device according to claim 11, wherein said access point is a wireless access point of a Wireless Local Access Network (WLAN) and the detected access point identity of said access point is a Basic Set Service Identity (BSSID) of the access point.

13. The user device according to claim 12, further comprising a wireless transceiver module configured to communicate with said wireless access point.

14. The user device according to claim 11, further comprising an IP Multimedia Subsystem (IMS) network for enabling said communication service session.

15. The user device according to claim 14, wherein said second registration entity is configured to perform the registration of said user device by sending an SIP Register message to the location service within the IMS network, the SIP Register message including at least the detected access point identity of said access point.

16. A system for implementing a location service within a communication network, the location service being implemented by a Session Initiation Protocol (SIP) application server, and the system comprising:
a first receiver for receiving and a registration entity for registering, in a registration database, a first access point identity, for each of a multiplicity of user devices, wherein, to register the first access point identity, the location service sends a query requesting for the geographical address associated with the first access point identity, and in response to the query, the location service receives the geographical address associated with the first access point identity; and
a second receiver for receiving, in connection with a user registration to a communication service, a second access point identity, wherein the first access point identity, registered in said registration database, and the second access point identity are used to perform a lookup in order to identify a geographical address for the user registration to the communication service.

17. The system according to claim 16, wherein the system is configured to operate within an IP Multimedia Subsystem (IMS) network, and wherein the communication service registration is an IMS registration.

18. The system according to claim 17, wherein said first receiver is configured to receive at least said first access point identity from a user device in an SIP Register message.

19. The system according to claim 17, wherein said registration database comprises a Home Subscriber Server (HSS) or other data store of the IMS network.

20. The system according to claim 16, wherein said second receiver is configured to receive, in a session setup request, the second access point identity for a session of said communication service.

* * * * *